US012357530B2

(12) United States Patent
Curley

(10) Patent No.: US 12,357,530 B2
(45) Date of Patent: Jul. 15, 2025

(54) SELF-CONFORMING MASSAGE GUN AND METHOD

(71) Applicant: Charles M. Curley, Cortland, NY (US)

(72) Inventor: Charles M. Curley, Cortland, NY (US)

( * ) Notice: Subject to any disclaimer, the term of this patent is extended or adjusted under 35 U.S.C. 154(b) by 733 days.

(21) Appl. No.: 17/489,014

(22) Filed: Sep. 29, 2021

(65) Prior Publication Data

US 2022/0354735 A1 Nov. 10, 2022

Related U.S. Application Data

(60) Provisional application No. 63/184,420, filed on May 5, 2021.

(51) Int. Cl.
*A61H 23/00* (2006.01)
*A61H 23/02* (2006.01)

(52) U.S. Cl.
CPC ........... *A61H 23/006* (2013.01); *A61H 23/02* (2013.01); *A61H 2201/0153* (2013.01); *A61H 2201/1683* (2013.01)

(58) Field of Classification Search
CPC ....... A61H 1/006; A61H 1/008; A61H 23/006
USPC .................................. 601/107; D24/214–215
See application file for complete search history.

(56) References Cited

U.S. PATENT DOCUMENTS

| | | | |
|---|---|---|---|
| 3,626,934 | A | 12/1971 | Andis |
| 4,150,668 | A | 4/1979 | Johnston |
| 4,173,217 | A | 11/1979 | Johnston |
| 4,549,535 | A | 10/1985 | Wing |
| 4,566,442 | A | 1/1986 | Mabuchi et al. |
| 4,730,605 | A | 3/1988 | Noble et al. |
| 5,085,207 | A | 2/1992 | Fiore |
| 5,417,644 | A | 5/1995 | Lee |
| 5,569,168 | A | 10/1996 | Hartwig |
| 5,573,500 | A | 11/1996 | Katsunuma et al. |
| 5,951,501 | A | 9/1999 | Griner |
| 6,228,042 | B1 | 5/2001 | Dungan |
| 6,537,236 | B2 | 3/2003 | Tucek et al. |
| D478,385 | S | 8/2003 | Dirks et al. |
| 6,663,657 | B1 | 12/2003 | Miller |

(Continued)

FOREIGN PATENT DOCUMENTS

| | | |
|---|---|---|
| AU | 2020202233 B2 | 6/2020 |
| CN | 206880835 U | 1/2018 |

(Continued)

OTHER PUBLICATIONS

Translation of DE 202021101048 (Year: 2021).*
Translation of WO 2014054450 (Year: 2014).*

*Primary Examiner* — Valerie L Woodward
*Assistant Examiner* — Paige Kathleen Bugg
(74) *Attorney, Agent, or Firm* — Chris Tanner; FYPA PLLC

(57) ABSTRACT

An attachment for a massage gun which aids the user in holding the massage gun steady while focusing on a target muscle without requiring two hands as well as reduces user fatigue while focusing on a target muscle for longer periods of time. The attachment of the embodiments of the present invention is light weight and easily attachable and detachable to a massage gun. The attachment includes a first portion mountable to a handle of the handheld massage gun, a second portion connected to the first portion at an angle and a flexible third portion having an axis orthogonal to the first portion.

29 Claims, 12 Drawing Sheets

(56) References Cited

U.S. PATENT DOCUMENTS

| | | | | |
|---|---|---|---|---|
| 6,682,496 | B1 | 1/2004 | Pivaroff | |
| 6,758,826 | B2 * | 7/2004 | Luettgen | A61H 23/0254 601/72 |
| 7,169,169 | B2 | 1/2007 | Tucek et al. | |
| D553,252 | S | 10/2007 | Masuda | |
| D556,913 | S | 12/2007 | Laituri | |
| D609,817 | S | 2/2010 | Piller et al. | |
| 7,927,259 | B1 | 4/2011 | Rix | |
| 8,083,699 | B2 | 12/2011 | Colloca et al. | |
| D659,843 | S | 5/2012 | Wang | |
| 8,342,187 | B2 | 1/2013 | Kalman et al. | |
| D684,723 | S | 6/2013 | Tsai | |
| D696,786 | S | 12/2013 | Bradford | |
| D703,825 | S | 4/2014 | Barrett | |
| 8,777,881 | B2 | 7/2014 | Tsai | |
| 8,951,216 | B2 | 2/2015 | Yoo et al. | |
| D734,863 | S | 7/2015 | Hennessey | |
| 9,265,689 | B2 | 2/2016 | Stanbridge | |
| 9,272,141 | B2 | 3/2016 | Nichols | |
| 9,289,348 | B2 | 3/2016 | Kanbar et al. | |
| 9,345,633 | B2 | 5/2016 | Fuhr et al. | |
| 9,687,416 | B2 | 6/2017 | Turner | |
| 9,889,066 | B2 | 2/2018 | Danby et al. | |
| 10,016,337 | B2 | 7/2018 | Roberts | |
| D826,418 | S | 8/2018 | Lad | |
| D840,547 | S | 2/2019 | Harle et al. | |
| D847,364 | S | 4/2019 | Lee et al. | |
| 10,252,051 | B2 | 4/2019 | Nichols | |
| 10,314,762 | B1 | 6/2019 | Marton et al. | |
| 10,357,425 | B2 | 7/2019 | Wersland et al. | |
| D855,822 | S | 8/2019 | Marton et al. | |
| D863,571 | S | 10/2019 | Yang | |
| 10,470,970 | B2 | 11/2019 | Nazarian et al. | |
| D872,869 | S | 1/2020 | Lu | |
| D873,432 | S | 1/2020 | Duan | |
| D874,015 | S | 1/2020 | Marton et al. | |
| D875,961 | S | 2/2020 | Li | |
| 10,561,574 | B1 * | 2/2020 | Marton | A61H 23/006 |
| D879,985 | S | 3/2020 | Wersland et al. | |
| D879,986 | S | 3/2020 | Wersland et al. | |
| D880,714 | S | 4/2020 | Wersland et al. | |
| D880,715 | S | 4/2020 | Wersland et al. | |
| D880,716 | S | 4/2020 | Wersland et al. | |
| D884,205 | S | 5/2020 | Zhuang | |
| D884,207 | S | 5/2020 | Ma | |
| D884,915 | S | 5/2020 | Wersland et al. | |
| 10,661,072 | B2 | 5/2020 | Kern et al. | |
| D887,573 | S | 6/2020 | Wersland et al. | |
| 10,702,448 | B2 | 7/2020 | Wersland et al. | |
| D893,738 | S | 8/2020 | Zhuang | |
| D895,132 | S | 9/2020 | Hu | |
| D895,133 | S | 9/2020 | Ku | |
| D895,135 | S | 9/2020 | Xu | |
| D895,829 | S | 9/2020 | Hu | |
| D895,831 | S | 9/2020 | Chen | |
| D896,396 | S | 9/2020 | Wersland et al. | |
| 10,758,452 | B2 | 9/2020 | Wersland et al. | |
| D897,946 | S | 10/2020 | Liu | |
| D898,209 | S | 10/2020 | Xu | |
| D898,933 | S | 10/2020 | Xu | |
| D899,620 | S | 10/2020 | Huang | |
| 10,806,660 | B1 | 10/2020 | Smith, Jr. et al. | |
| 10,842,703 | B2 | 11/2020 | Zhang | |
| 10,847,984 | B2 | 11/2020 | Solana et al. | |
| D905,863 | S | 12/2020 | Lin | |
| D906,533 | S | 12/2020 | Xu | |
| 10,857,064 | B2 | 12/2020 | Wersland et al. | |
| D907,229 | S | 1/2021 | Zhang | |
| D907,230 | S | 1/2021 | Zhang | |
| D908,908 | S | 1/2021 | Xu | |
| 10,888,492 | B2 | 1/2021 | Marton et al. | |
| D911,535 | S | 2/2021 | Yu | |
| 10,905,621 | B2 | 2/2021 | Maichel et al. | |
| 10,905,627 | B2 | 2/2021 | Marton et al. | |
| D912,267 | S | 3/2021 | Tang | |
| 10,959,908 | B2 | 3/2021 | Lee et al. | |
| D918,408 | S | 5/2021 | Huang | |
| D918,411 | S | 5/2021 | Xu | |
| D920,531 | S | 5/2021 | Xu | |
| D921,215 | S | 6/2021 | Xu | |
| D921,914 | S | 6/2021 | Wersland et al. | |
| D923,188 | S | 6/2021 | Xu | |
| D923,190 | S | 6/2021 | Xu | |
| D923,194 | S | 6/2021 | Xu | |
| D925,751 | S | 7/2021 | Wu | |
| D925,756 | S | 7/2021 | Xu | |
| D925,758 | S | 7/2021 | Xu | |
| D958,389 | S * | 7/2022 | Minkus | D24/215 |
| 11,723,830 | B1 * | 8/2023 | Marton | A61H 23/006 601/108 |
| 11,819,296 | B1 * | 11/2023 | Silver | A61H 7/001 |
| 2008/0125680 | A1 | 5/2008 | Richmond et al. | |
| 2012/0209156 | A1 | 8/2012 | Leismer et al. | |
| 2013/0261516 | A1 * | 10/2013 | Cilea | A61H 23/006 601/108 |
| 2017/0304145 | A1 * | 10/2017 | Pepe | A61H 23/02 |
| 2019/0083354 | A1 | 3/2019 | Pahl | |
| 2019/0350793 | A1 * | 11/2019 | Wersland | A61H 23/006 |
| 2020/0261306 | A1 | 8/2020 | Pepe | |
| 2021/0022953 | A1 * | 1/2021 | Wilson | A61H 15/0092 |
| 2021/0219999 | A1 | 7/2021 | Hoffman | |
| 2021/0244609 | A1 * | 8/2021 | Lee | A61H 23/006 |
| 2021/0322257 | A1 * | 10/2021 | Lee | A61H 15/0078 |
| 2021/0361519 | A1 * | 11/2021 | Hagy | A61H 7/005 |
| 2022/0015988 | A1 * | 1/2022 | Williams | A61H 23/006 |
| 2022/0079836 | A1 * | 3/2022 | Heltsley | A61H 15/0085 |
| 2022/0117841 | A1 * | 4/2022 | Tellam | A61H 37/00 |

FOREIGN PATENT DOCUMENTS

| | | | | |
|---|---|---|---|---|
| CN | 107822844 | A | 3/2018 | |
| CN | 208525375 | U | 2/2019 | |
| CN | 109907965 | A | 6/2019 | |
| CN | 106137709 | B | 7/2019 | |
| CN | 211157196 | U | 8/2020 | |
| CN | 212854024 | U | 4/2021 | |
| DE | 202015104519 | U1 | 9/2015 | |
| DE | 202021101048 | U1 * | 4/2021 | A61H 15/0085 |
| JP | 2016120107 | A | 7/2016 | |
| JP | 6640719 | B2 | 2/2020 | |
| JP | 6720253 | B2 | 7/2020 | |
| JP | 3228625 | U | 11/2020 | |
| KR | 101123926 | B1 | 4/2012 | |
| KR | 20190000098 | U | 1/2019 | |
| KR | 20190021343 | A | 3/2019 | |
| WO | WO-2014054450 | A1 * | 4/2014 | A61H 15/0092 |
| WO | 2015038005 | A2 | 3/2015 | |
| WO | 2020227520 | A1 | 11/2020 | |

* cited by examiner

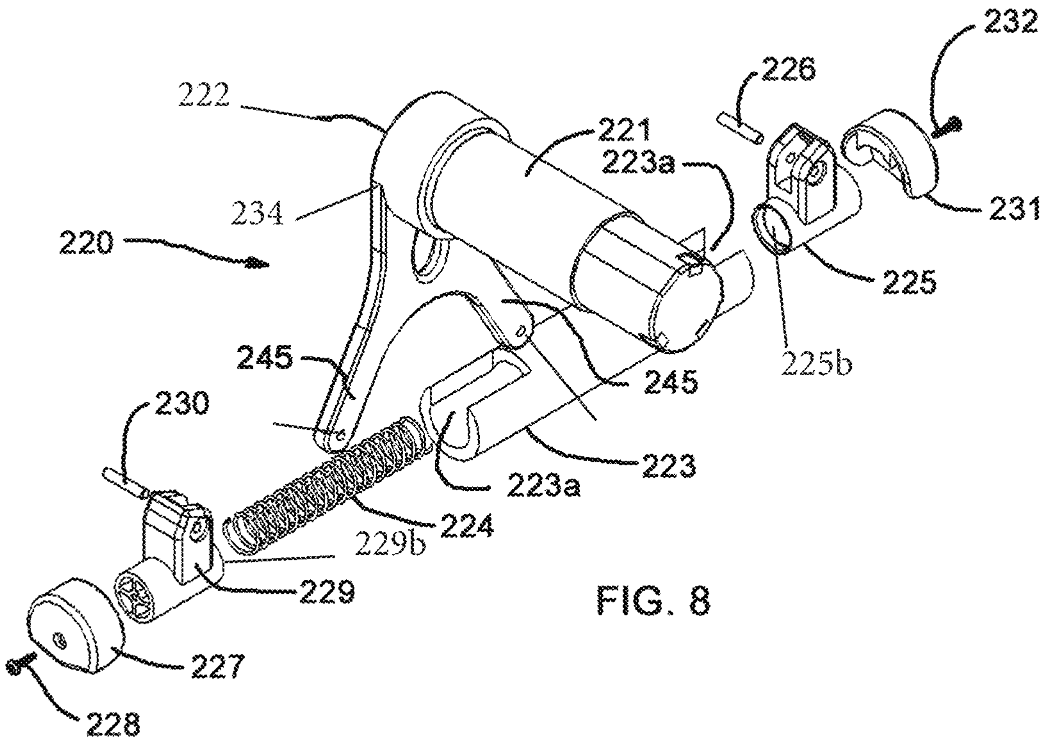
FIG. 8
FIG. 9
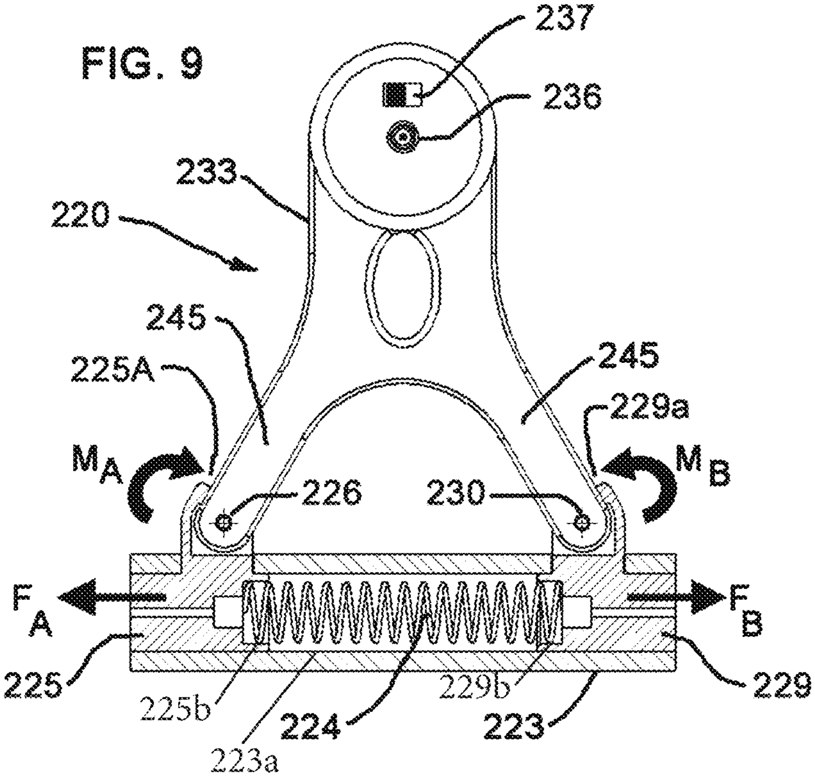

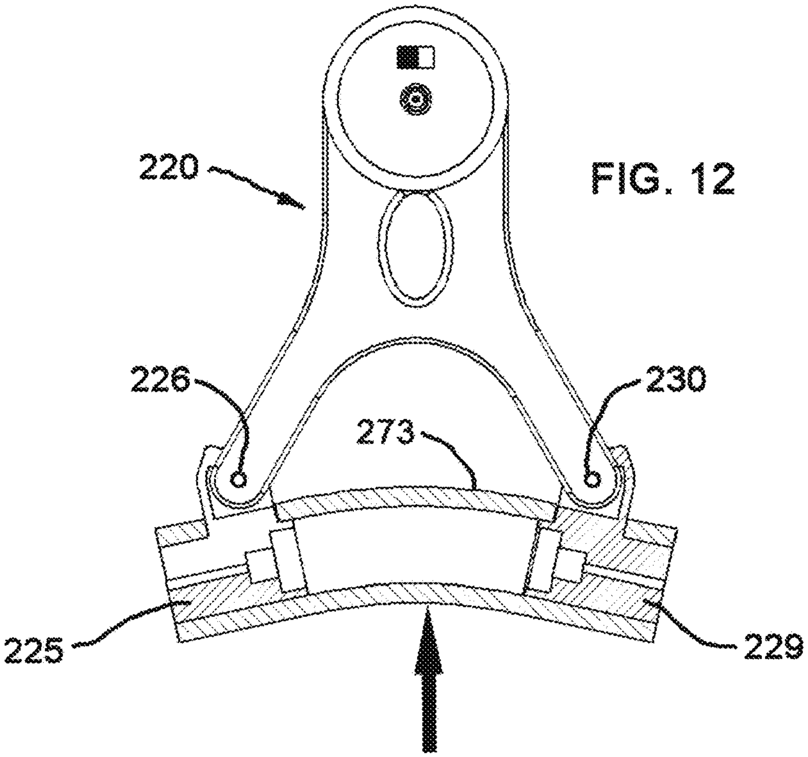
FIG. 12
FIG. 13
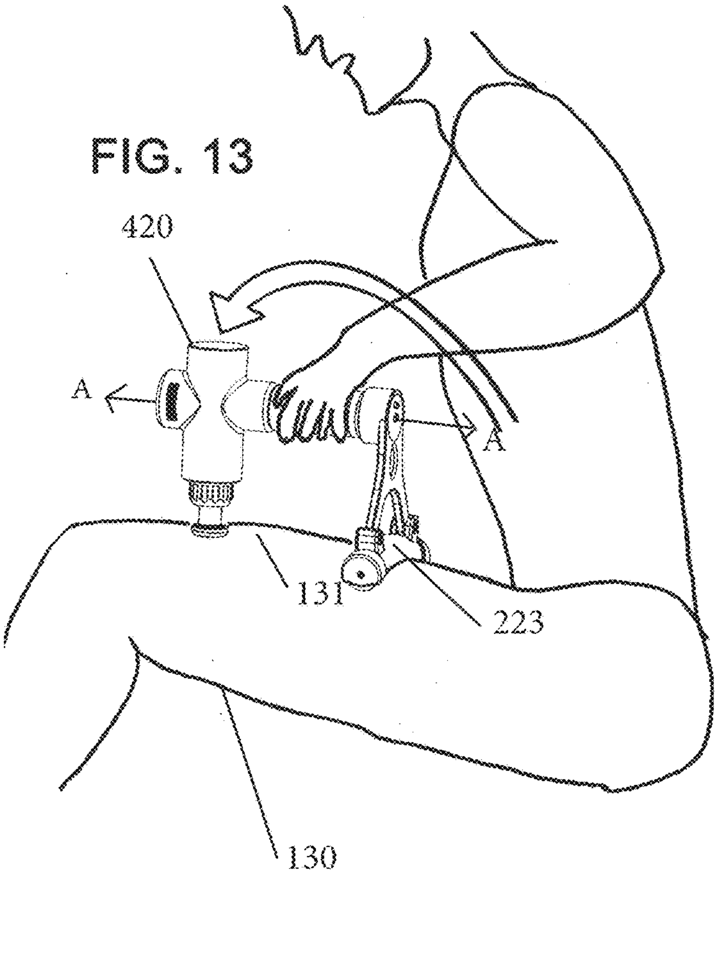

SELF-CONFORMING MASSAGE GUN AND METHOD

CROSS-REFERENCE TO RELATED APPLICATIONS

This application claims one or more inventions which were disclosed in Provisional Application No. 63/184,420 filed May 5, 2021, entitled “SELF-CONFORMING MASSAGE GUN AND METHOD”. The benefit under 35 USC § 119(e) of the United States provisional application is hereby claimed, and the aforementioned application is hereby incorporated herein by reference.

BACKGROUND

The invention herein is in the field of percussive massage devices that apply vibratory massage impulses to selected muscle groups of the human body.

Percussive massage is the process of using rapid repeated impulses of short duration to specific muscle groups of the human body. While originally performed with the human hands of massage therapists, tools called “massage guns” have more recently become available to perform this type of massage therapy. Massage guns are handheld electromechanical devices which provide repeating mechanical impulses to an impulse head that is pressed against specific areas of the human body. The user holds the impulse head against an area of the body and the motorized device causes the head to rapidly vibrate with various forces and frequencies which are adjustable by the user. Common massage gun heads are shaped like spheres, cups and forks, which are usually provided as exchangeable attachments that snap into the vibrating end of the massage gun.

Massage guns are said to treat sore muscles after exercise, to increase blood circulation, to relieve muscle stiffness, to increase range of joint movement and to reduce inflammatory muscle reaction. These devices usually possess controls which allow the user to adjust the frequency of the vibratory impulses. An example of a battery powered massage gun configuration is shown in the prior art illustrations of FIGS. 1-3 which are similar to that described in U.S. Pat. No. 10,561,574. Other similar configurations are shown by Taiwan Utility Model No. TW543692 and Chinese Utility Model No. CN210844173U. Many other similar configurations are on the market where the detachable battery housing functions in the dual roles of securely storing the battery and acting as the “pistol handle” for grasping the device.

FIG. 1 shows a common configuration of a prior art percussive massage gun 100. A percussive massage head 105 with a spherical shape is mounted on the end of a piston 104 that reciprocates in the direction of the axis of the body 102 of the main housing 101 to create a vibratory impulsive movement. The main housing 101 has a cylindrical extension 103 which houses a battery-driven motor. A removable battery assembly 118 includes an opposing cylindrical extension 116. The battery assembly 118 has the dual functions of housing the battery and also acting as the handle tier the massage gun 100. The user grasps the cylindrical extension 116 of the removable battery assembly 118 in a way similar to grasping a pistol, and then presses the massage head 105 against the target muscle or tissue of the human body. The vibration is initiated by engaging the “ON” switch 107 which is located on the distal end of the removable battery assembly 118.

FIG. 2 shows the percussive massage gun device 100 with the battery assembly 118 removed from the main body 102.

The receiving cavity 108 of the main housing 101 contains a latch (not shown) which allows the battery assembly 118 to be inserted and secured into the cavity 108. Battery contacts 109 mate with receiving contacts within the cavity 108 in order to provide voltage for the motor. The cavity 108 additionally contains a guide rail 110 which prevents the battery assembly 118 from rotating within the cavity 108. The detachable battery feature allows one battery assembly to be charging while another is being utilized in the massage gun. Charging of the battery is accomplished by inserting a charger into charging port 106.

An exploded view of the removable battery assembly 118 components is shown in FIG. 3. The battery pack 120 is contained within a shell consisting of molded plastic housing halves 111, 112. An end cap 113 is used to mount the ON-OFF switch 107. The battery pack 120 may be composed of a single large lithium-ion battery or several smaller lithium-ion batteries connected in series. Rechargeable NiCad batteries could also be utilized. Between the end cap 113 and the housing 111 is a disk 115 including the electronics associated with the charging port 106. Between the disk 115 and the end cap 113 is a sealing ring 114.

The effectiveness of the massage gun depends upon the user’s ability to hold the gun steady while applying pressure to the target muscle location. The vibratory action of the reciprocating head causes an equal reaction at the user’s hand, which makes it difficult to hold the gun focused at the target location, especially at low oscillation speeds. The gun tends to vibrate erratically especially when used on stiller muscle groups, making it difficult for the user to control the location of the massage head. The reaction of the user also causes fatigue when attempting to focus the gun in a specific location for a long period of time.

One solution for improving stability of the massage head over the muscle target is to use two hands to steady the massage gun as described in Chinese Published Application No. CN111084714A (referred to as CN’714) which discloses an ergonomically improved massage gun that uses two handles that are arranged in the shape of a Y, as shown in prior art FIG. 4. Prior art FIG. 5 is an excerpt from CN’714 which shows the Y-shaped massage gun being used on a person’s back. CN’714 details that “two handles allow the therapist to massage with great force and the relatively large distance between the positions where the therapist grips the device makes the stability more pronounced so that the massager does not easily slide off its intended position and target site on the patient’s body.” CN’714 further states “[t]he device also allows for reduced fatigue in use, compared to various existing massagers, whether individual users or therapists.”

SUMMARY

One embodiment of the invention herein is an attachment that takes the form of a battery housing with an extension that allows the user to stabilize the massage gun when applying pressure at the vibrating head. A focusing rest stabilizer snaps into the massage gun in the place of the original battery, using the same latch mechanism as used to secure the original battery assembly to the massage gun. The distal end of the focusing rest possesses a flexible cylindrical cushion which helps to anchor and support the device while focusing the vibratory nose end on a specific body part. The cushion axis is oriented orthogonal to the handle axis, which allows the flexible cushion to conform to the curvature of the anatomical surface on which it is mounted, thus allowing the curvature to assist in stabilizing the massage gun axis during vibration cycling.

In another embodiment of the invention, the self-conforming focusing rest is designed to securely snap onto the original battery housing. In this embodiment, the attachment does not function as the battery for the massage gun.

Another aspect of the invention is the ability to make the massage gun self-standing. With the focusing rest attached, the massage gun stands in a position that is easily and more naturally graspable by the user.

Another aspect of the embodiments disclosed herein is a method of operating a percussive massage gun. The method allows the operator to use the device as a lever, so as to apply controllable rotational force against the vibrating end of the device while using the self-conforming flexible cushion as a fulcrum.

The embodiment of the present invention aids the user in holding the gun steady while focusing on a target muscle without requiring two hands as well as reduces user fatigue while focusing on a target muscle for longer periods of time. The anatomy-conforming feature facilitates comfortable contact when used with muscle groups of the curvaceous type, such as arms, legs and buttocks. The flexible cylindrical cushion is also effective in working on relatively flat anatomical surfaces due to the vector arrangement of a spring mechanism design. The accessory of the embodiments of the present invention are light weight, cost effective, simple to manufacture and easily attachable and detachable to a massage gun.

BRIEF DESCRIPTION OF THE DRAWINGS

FIG. 8 is an exploded view of the self-conforming focusing rest attachment.

FIG. 9 is rear view of the self-conforming focusing attachment of the preferred embodiment showing the geometry of the spring-actuated flexing mechanism.

FIG. 12 is an illustration showing an alternate embodiment which eliminates the compression spring of the preferred embodiment.

FIG. 13 is an illustration showing the method of percussive massage when utilizing the focusing rest on an elongated limb such as the upper leg.

DETAILED DESCRIPTION

Figure 1:
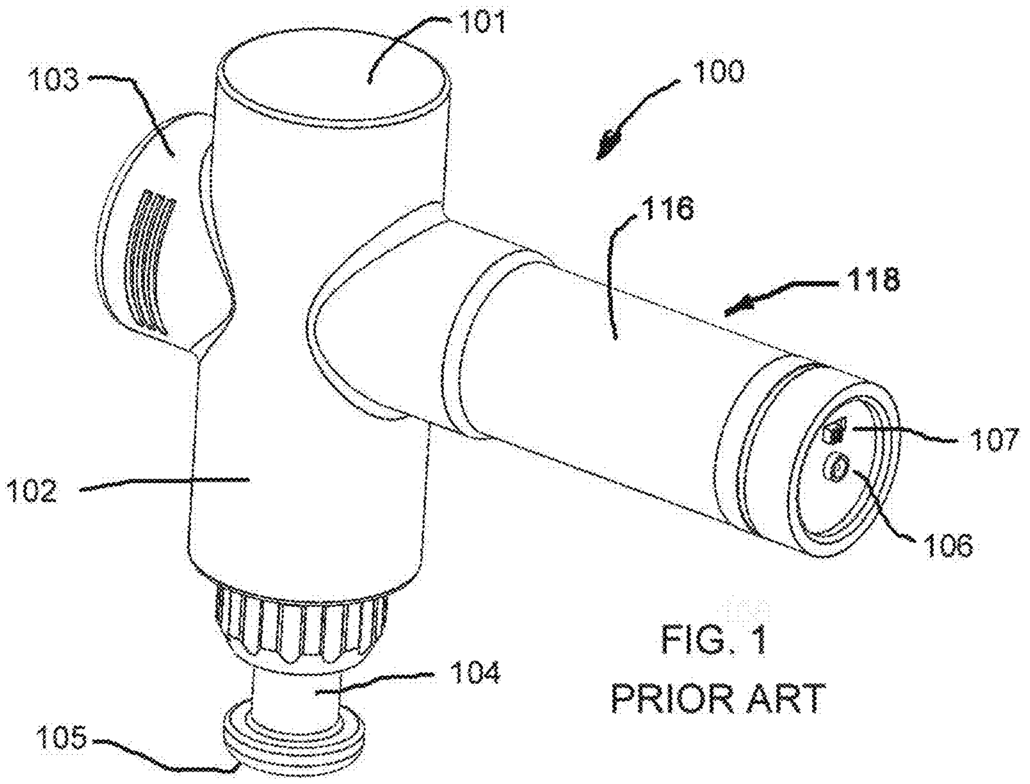
FIG. 1 PRIOR ART
FIG. 1 is an illustration of a common prior art massage gun configuration.
Figure 2:
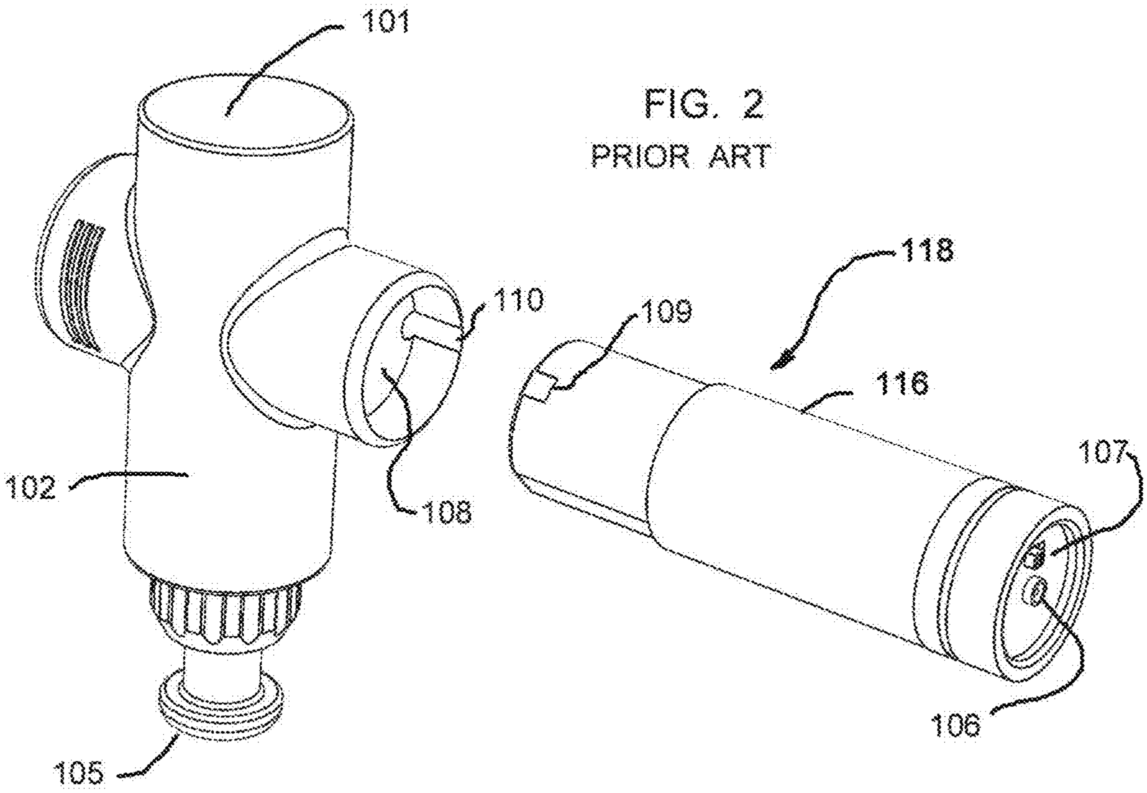
FIG. 2 PRIOR ART
FIG. 2 is an illustration of the prior art massage gun with the interchangeable battery housing removed.
Figure 3:
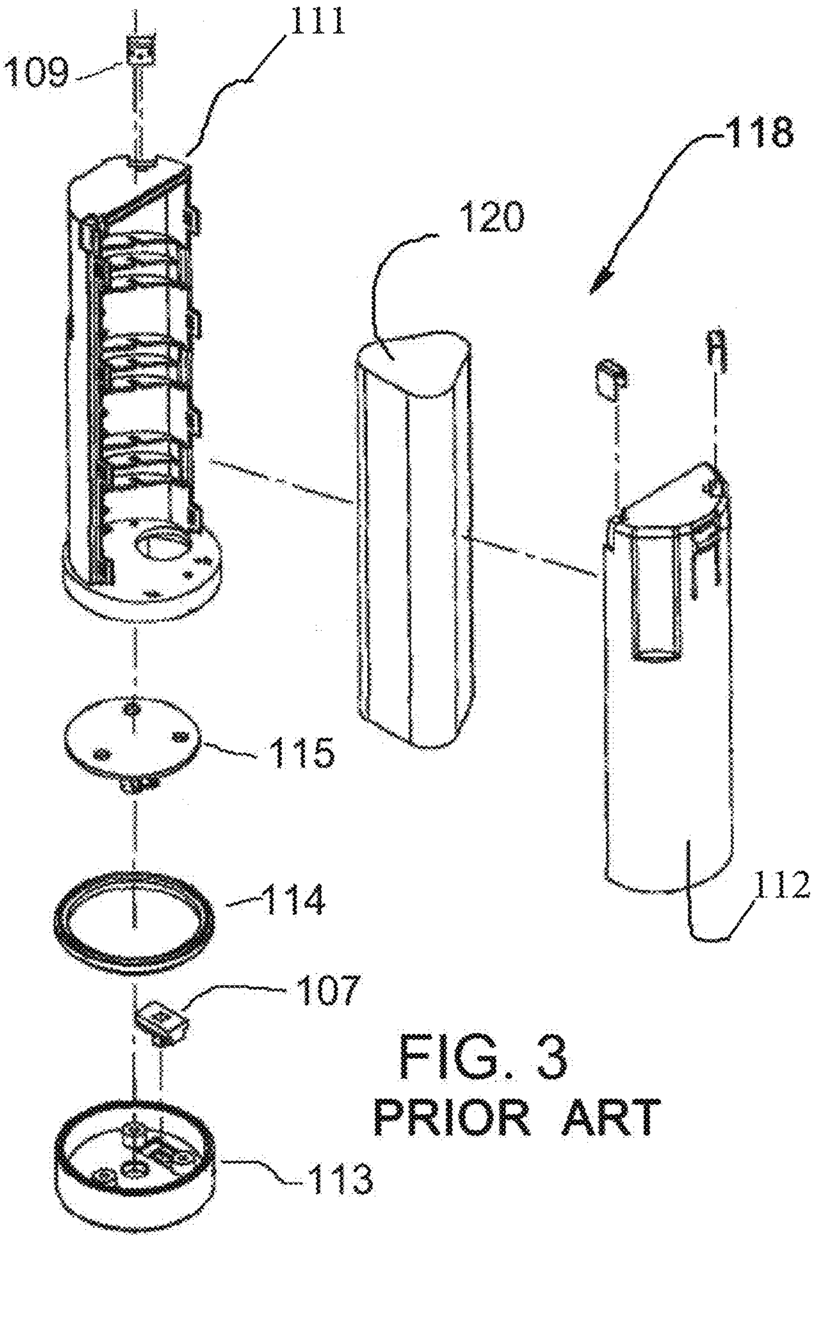
FIG. 3 PRIOR ART
FIG. 3 is an exploded view showing the construction of the prior art battery housing components.
Figure 4:
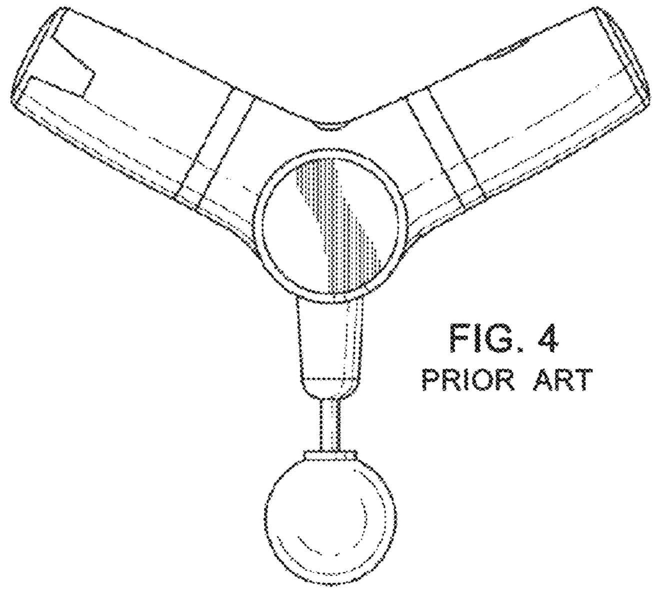
FIG. 4 PRIOR ART
FIG. 4 is an illustration of a prior art Y-shaped massage gun.
Figure 5:
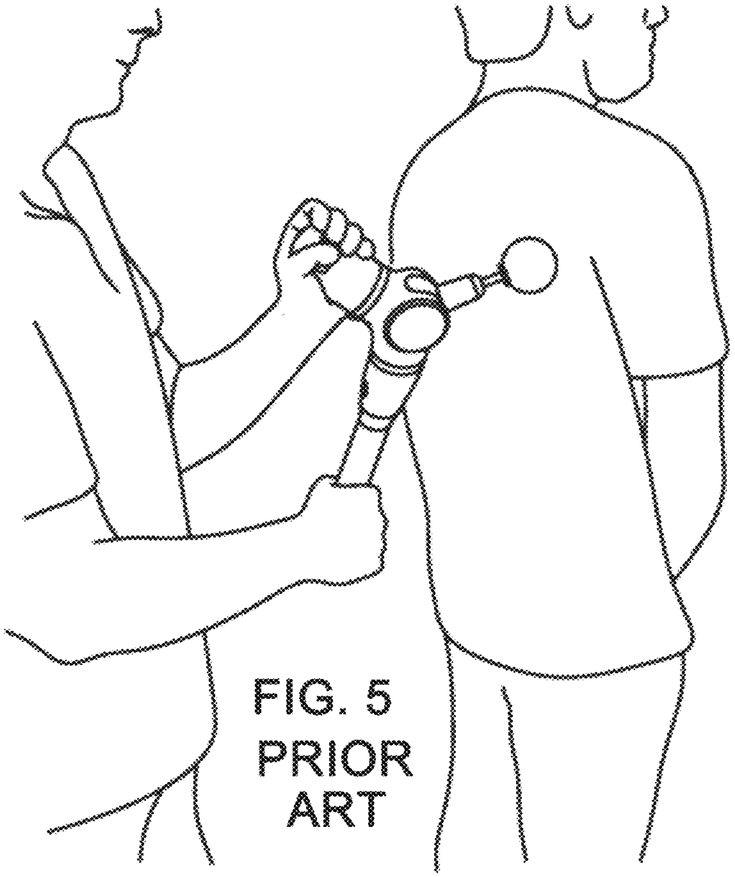
FIG. 5 PRIOR ART
FIG. 5 is an illustration of a prior art Y-shaped massage gun in use on a person's back.
Figure 6:
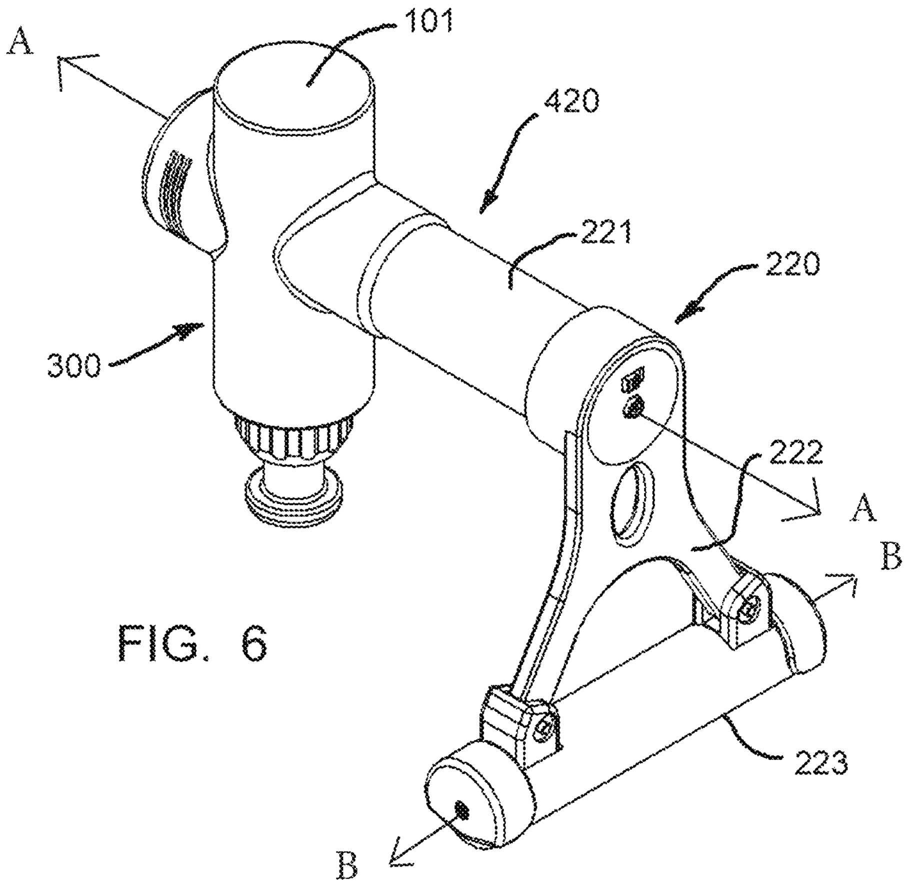
FIG. 6 is an illustration of the self-conforming focusing rest attachment of an embodiment of the present invention, when attached to a prior art massage gun.
Figure 7:
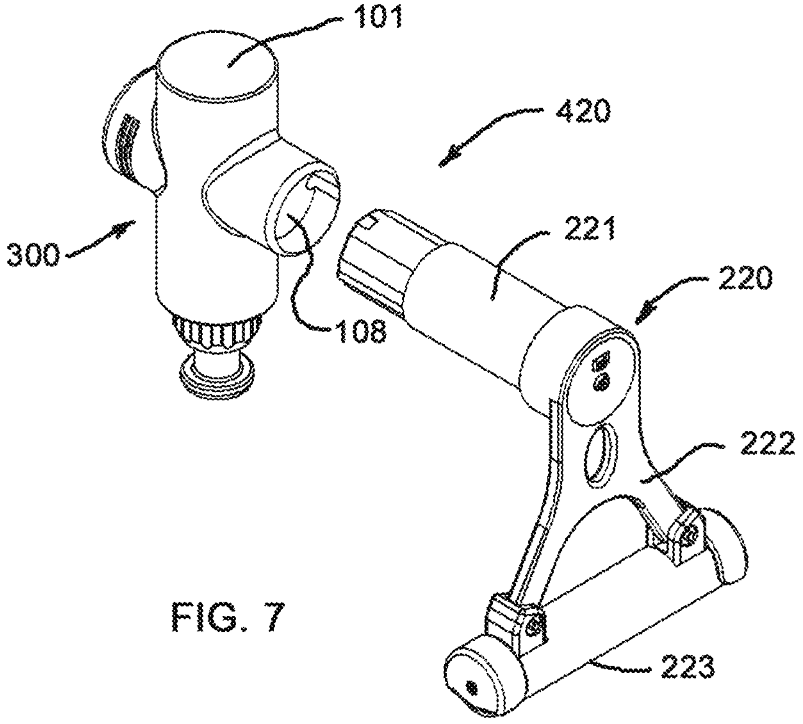
FIG. 7 is an illustration of the self-conforming focusing rest attachment of an embodiment of the present invention, when disengaged from the battery cavity of the massage gun.

FIG. 6 and FIG. 7 show a compact stabilizing solution for a massage gun of a preferred embodiment of the present invention. A focusing rest massage gun attachment 220 is shown attached to a main body 300 of the massage gun 420 that enables the user to hold the gun steady while focusing on a target muscle without requiring two hands. The focusing rest attachment 220 snaps into the receiving cavity 108 of the body 102 of the main housing 101 in the place of the original battery assembly 118, using the same latch mechanism 110 as used to receive and secure the original battery assembly 118.

FIG. 7 is an illustration of the massage gun 420 with the focusing rest attachment 220 removed from the receiving cavity 108. In an alternate embodiment, the focusing rest attachment 220 may be made a non-detachable, permanent part of the main body 300 of the massage gun 420.

The focusing rest attachment 220 consists of a first portion 221 that forms a cylindrical handle which is gripped by the user and includes the components of the original battery assembly 118. A second portion 222, extending approximately perpendicular to the first portion 221, forms an anchoring support surface for the massage gun. In this embodiment, the second portion 222 is sized so as to support the massage gun in a position Whereupon the axis A-A of the first portion 221 is approximately parallel to the surface being massaged (see FIG. 13). In other embodiments, the second portion 222 may be longer or shorter to create a different angular orientation of the first portion 221 relative to the second portion 222, such that the angle between the first portion 221 and the second portion 222 is greater than 90 degrees or less than 90 degrees.

A third portion of a flexible tubular contact surface cushion 223 forms a contact surface of the focusing rest attachment 220, and is made from a soft conformable material such as a foamed silicone rubber sleeve, which also has a high friction coefficient. The axis B-B of the cylindrical, flexible, tubular contact surface cushion 223 is orthogonal to the axis A-A of the first cylindrical portion 221 of the massage gun that is grasped by the user and utilized as the massage gun handle prior to being deformed. The contact surface cushion 223 is deformable such that the cushion bends into the shape of an arc when pressed against a convex, curvaceous surface, such as a limb.

FIG. 8 is an exploded view of the focusing rest attachment 220 of FIG. 7 and shows the detail of the contact surface cushion 223 and the components which are utilized to support it. The battery housing 233 consists of a first portion 221 and a second portion 222. The second portion 222 has a body 234 defining a recess 238 which receives an end of the first portion 221 and legs 245 which are used to support the contact surface cushion 223. The legs 245 provide journals 235, 236 for pins 226, 230 which support pivoting spring anchors 225, 229. The spring anchors 225, 229 define cavities **225*b*, 229*b* which receive the ends of a compression spring 224 which resides in an internal hollow cavity 223*a* of the contact surface cushion 223. The compression spring 224 rotates the spring anchors 225, 229 about the pivot pins 226, 230 as better shown in FIG. 9. End caps 227, 231 (FIG. 8) are utilized to contain the ends of the contact surface cushion 223, and are mounted to the rotatable spring anchors 225, 229 by self-tapping screws 228, 232**.

FIG. 9 shows a rear view of focusing rest attachment 220 in a partial section view in order to show the geometry of the spring mechanism. The end caps 227, 231 are not shown in this view for simplicity. The battery charging port 236 and on-off switch 237 are shown on the end portion of the battery housing 233. The ends of compression spring 224 are anchored in cavities **225*b*, 229*b* of pivoting spring anchors 225, 229 which are shown in section. The compression spring 224 pushes against the pivoting spring anchors 225, 229 producing vector forces $F_a$ and $F_b$ which in turn produce vector moments $M_a$ and $M_b$ about the pivot pins 226, 230. Pivot spring anchor 225 has a stop surface 225A which prevents clockwise rotation further than that shown in FIG. 9. Opposing pivot spring anchor 229 has a similar stop surface 229*a*. The axis B-B of the contact surface cushion 223 is controlled by the rotation of the pivotable spring anchors 225, 229 and the associated stop surfaces 225*a*, 229*a*. The result is that the contact surface cushion 223 is in equilibrium in FIG. 9 such that the axis B-B of the cushion 223 is straight, and also orthogonal to the axis A-A of the first portion 221 of the focusing rest attachment 220**.

Figure 10:
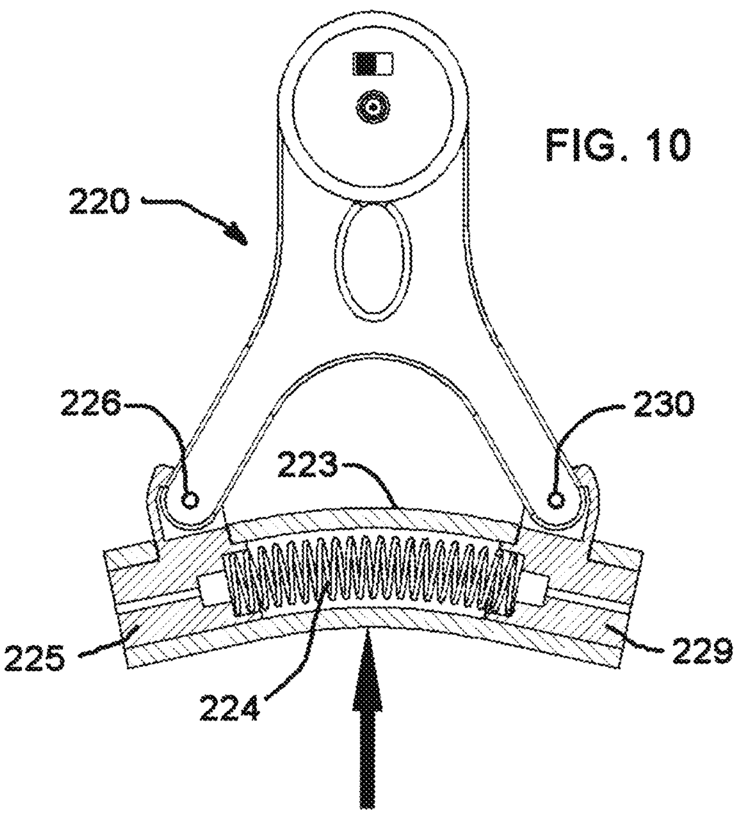
FIG. 10 is view of the spring-actuated mechanism when displaced by a mid-span vector such as a curvaceous anatomical surface.

FIG. 10 shows the response of flexible cylindrical cushion 223 when a vector force (see arrow) is applied in the span between the two pivot pins 226, 230. The vector force is transferred to the spring anchors 225, 229 which pivot about the pivot pins 226, 230, thus allowing the flexible cushion 223 to flex into an arc or concave relative to the vector force. This condition represents the state where a user compresses the flexible cushion 223 against a circular muscle such as an arm or a leg while aligning the handle axis A-A along the axis of that arm or leg. The pivoting or rotation of the spring anchors 225, 229 compresses the compression spring 224, such that compression spring 224 is now shorter than its equilibrium length and attempts to resist the vector force causing deformation. When the vector force is removed, the axis of the flexible cushion 223 is restored to the non-deformed state as shown in FIG. 9.

Figure 11:
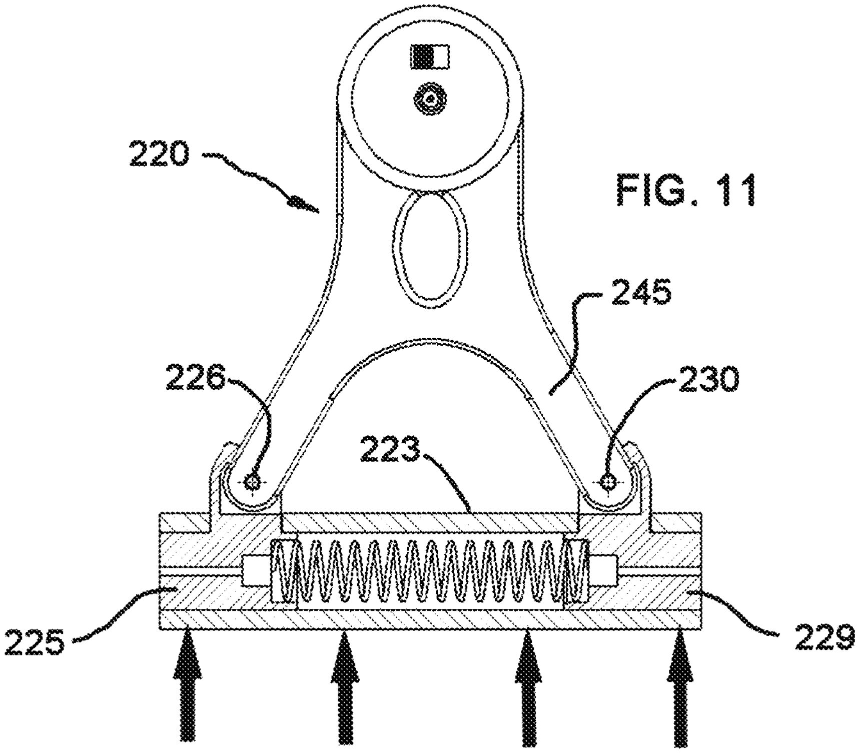
FIG. 11 is view of the spring-actuated mechanism when encountering a relatively flat anatomical surface.

FIG. 11 illustrates the response of the flexible cushion 223 when the massage gun 420 is used on a flat, or relatively flat muscle or tissue surface. The loading condition is known in mechanical engineering as a "uniformly distributed load". There are vectors (see arrows) operating on both sides of each pivot pin 226, 230, such that no bending of the cylindrical flexible cushion 223 can be produced. In this state, the user can firmly anchor the massage gun 420 while not causing the axis B-B of the flexible cushion 223 to collapse into bending or curve. In this way the flexible cushion 223 is self-conforming to the anatomical surface on which it is being compressed. If mounted to curvaceous surface, the flexible cushion 223 will flex accordingly into a conforming arc. If the surface is flat, the flexible cushion 223 will not flex into an arc.

In an alternate embodiment, rotatable component 225, 229 can be fixedly attached to the legs 245 of the second portion 222 to form an alternate embodiment wherein rotatable spring anchors 225, 229 are non-rotatable. In this alternate embodiment, the flexible cushion 223 will flex into shape that is non-circular (not shown).

In another alternate embodiment shown in FIG. 12, the compression spring 224 of the preferred embodiment may be eliminated by utilizing a deformable elastomeric material in the shape of a hollow elastomeric sleeve 273 for the cylindrical cushion which is self-restoring. In this embodiment the hollow elastomeric sleeve 273 is compressed in the axial direction at assembly, such that it will deflect and restore by its own compression strength according to Hooke's Law.

Figure 14:
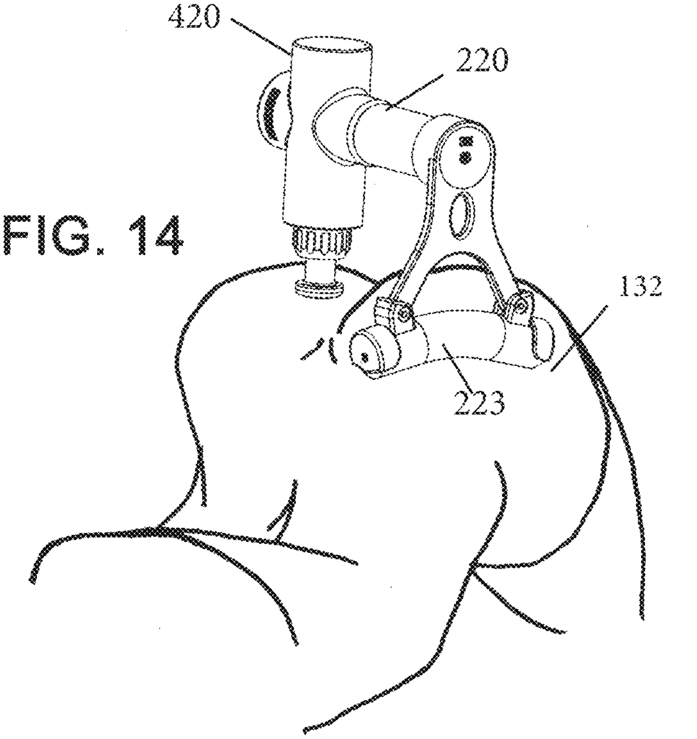
FIG. 14 is an illustration showing the method of percussive massage when utilizing the focusing rest on a curvaceous anatomical surface such as the buttocks.

A method of operating the massage gun 420 with the focusing rest attachment 220 is depicted in FIG. 13. The high friction contact cushion surface 223 is positioned onto the target limb 130 adjacent to the target muscle 131 such that the user can control the percussive pressure by rotational force. The contact cushion surface 223 of the focusing rest attachment 220 acts like the fulcrum of a lever, allowing the user to adjust massage pressure by leverage. In FIG. 14, the same technique is disclosed when utilizing the massage gun 420 with the focusing rest attachment 220 to massage the buttocks 132.

Figure 15:
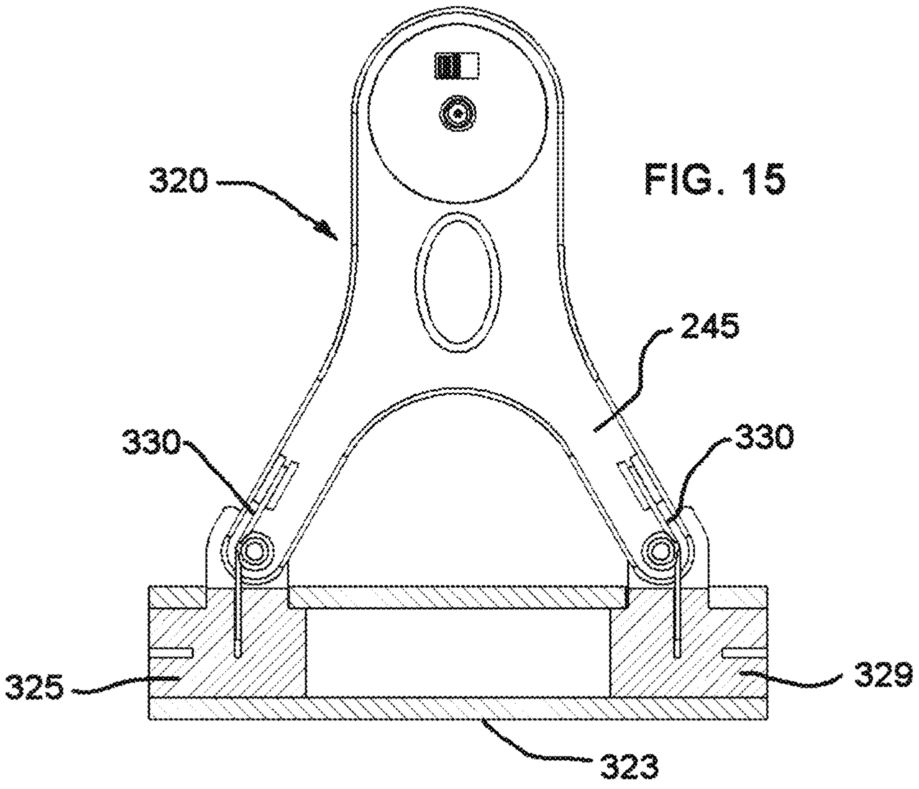
FIG. 15 is an illustration of an alternate embodiment of the self-conforming focusing rest which replaces the compression spring of the preferred embodiment with two torsion springs.

FIG. 15 is an illustration of an alternate embodiment of the self-conforming focusing rest attachment 320 which utilizes two torsion springs 330 in lieu of the compression spring 224 of focusing rest attachment 220. The torsion springs 330 of the focusing rest attachment 320 bias the orientation of the torsion spring anchors 325, 329 which pivotally control the orientation of the hollow cylindrical cushion 323. The torsion springs 330 are in equilibrium when the flexible contact cushion surface 323 resides in a straightened state, such as when the massage gun 420 is resting on a relatively flat surface. When the massage gun 420 is pressed against a curvaceous anatomical surface, the contact cushion surface 323 will react by bending accordingly through rotation of the torsion spring anchors 329, 329 via the torsion springs 330.

Figure 16:
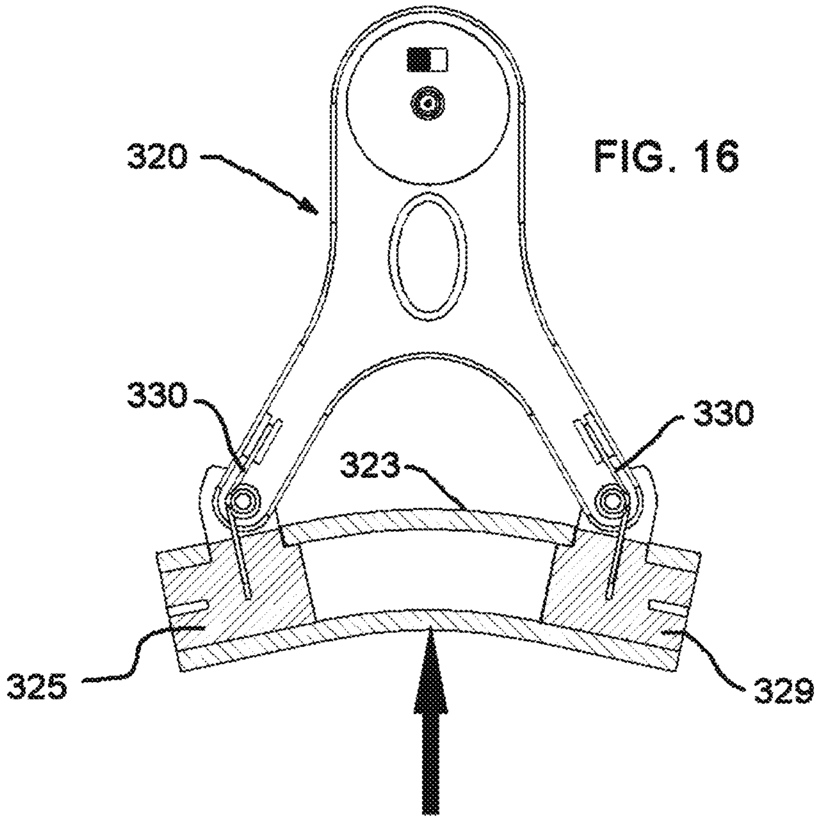
FIG. 16 is an illustration of the torsion spring alternate embodiment in one loading condition which causes the cushioned cylinder to flex in a concave manner

In FIG. 16, the cylindrical contact cushion surface 323 of the focusing rest attachment 320 is shown responding in a concave manner when the external vector (see arrow) resides at or near mid span of the contact cushion surface 323.

Figure 17:
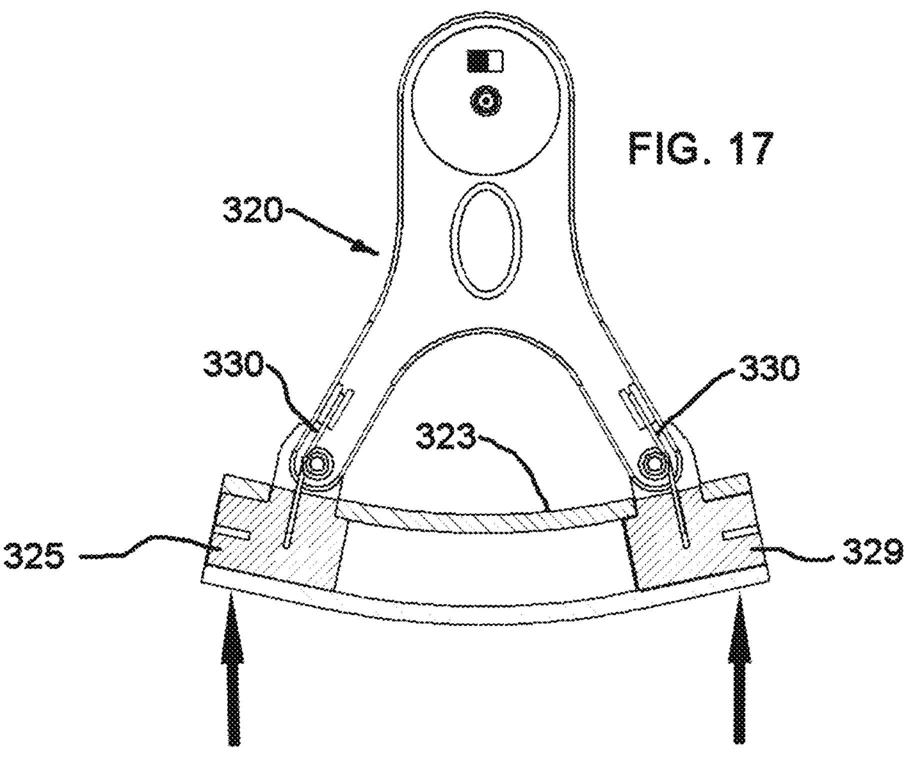
FIG. 17 is an illustration of the torsion spring alternate embodiment in another loading condition which causes the cushioned cylinder to flex in a convex manner

In FIG. 17, the contact cushion surface 323 is shown responding in a convex manner when the vectors (see arrows) are imposed near the ends of the elastomeric contact cushion surface 323. This latter case represents the placing of the contact cushion surface 323 of the focusing rest attachment 320 against a valley-type or concave anatomical surface.

In FIGS. 15-17 the end caps 227, 231 which mount on the terminal ends of the contact cushion surface 323, are not shown for reason of simplicity.

Figure 18:
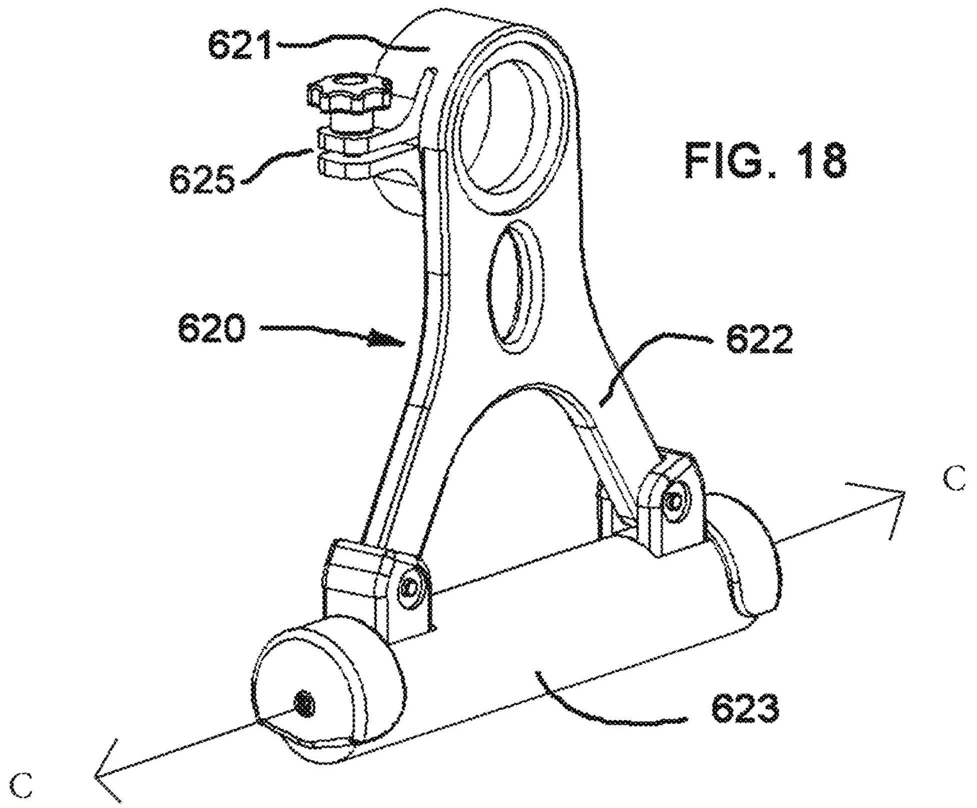
FIG. 18 is an illustration of an alternate embodiment of the self-conforming focusing rest which attaches to the exterior surface of the interchangeable battery assembly.
Figure 19:
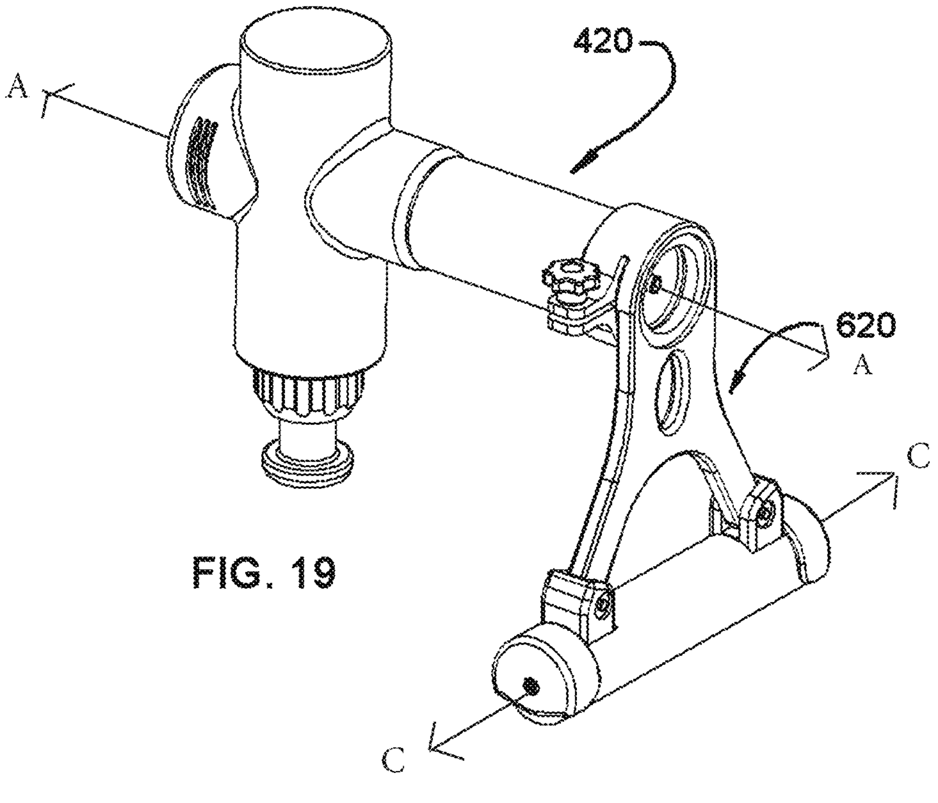
FIG. 19 is an illustration of an alternate embodiment of the self-conforming focusing rest when attached to the interchangeable battery assembly.

The invention may be implemented as an accessory which attaches to an interchangeable battery housing 118 by means of clamps, screws or other fasteners as described above. In FIG. 18 an alternative embodiment is shown which is independent of the interchangeable battery 118. In this embodiment the focusing rest 620 possesses an integrated clamp 625 which attaches to the first portion 221 of the interchangeable battery 118 and acts as a handle for the massage gun 420. The first portion 621 of the focusing rest 620 aligns with the axis A-A of the massage gun handle 221, a second portion 622 projects approximately perpendicular to the handle 221, and a third portion 623 has an axis C-C that is orthogonal to the massage gun handle 221. FIG. 19 shows the focusing rest 620 when attached to the battery housing 118 of the massage gun 420. The third portion 623 can be made of a deformable material as in FIGS. 15-17.

Figure 20:
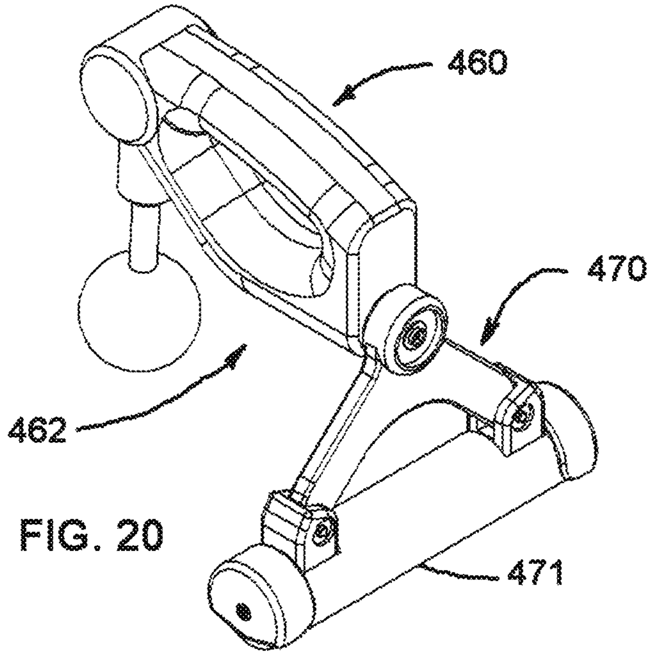
FIG. 20 is an illustration of the self-conforming focusing rest attachment of an embodiment of the present invention, when attached to a prior art massage gun having a D-shaped handle geometry.

FIG. 20 is an alternate embodiment of the invention that illustrates how the geometry of the focusing rest attachment is scalable for utilization by other massage gun configurations. The massage gun assembly 462 has a D-shaped housing 460 as commonly known in the art. The focusing rest attachment 470 is received by or plugs into the battery housing cavity 461 of the D-shaped housing 460 and provides a means to stabilize the massage gun assembly 462 while using it against a targeted muscle group.

Figure 21:
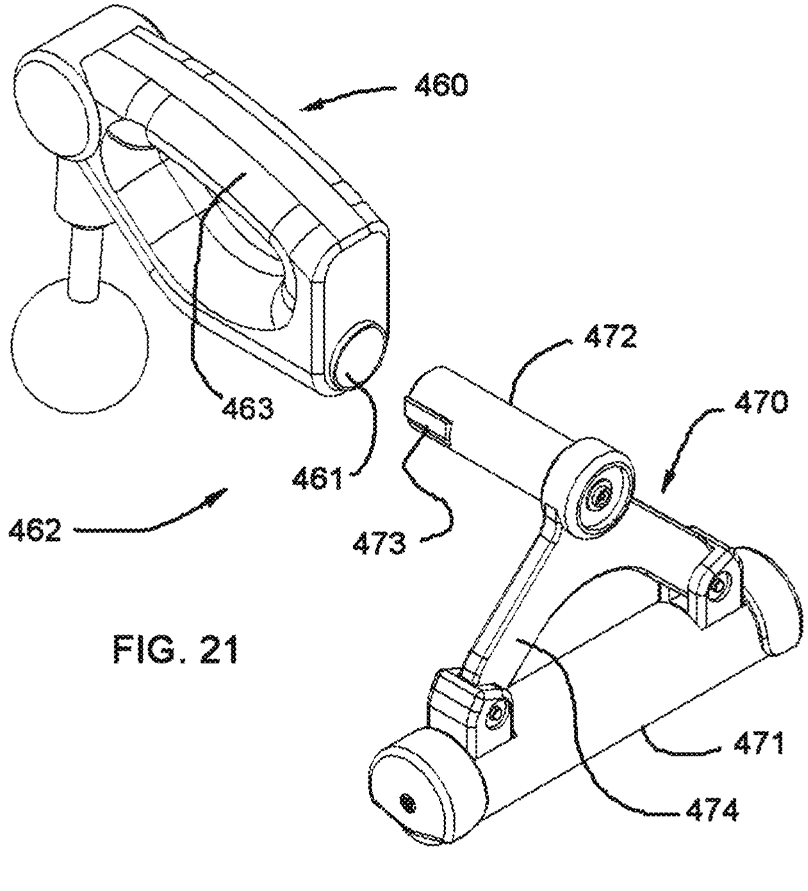
FIG. 21 is an illustration of the self-conforming focusing rest attachment of an embodiment of the present invention, when disengaged from the battery compartment cavity of the D-shaped massage gun.

FIG. 21 shows the D-shaped massage gun assembly 462 with the focusing rest attachment 470 removed from the battery housing cavity 461. The focusing rest attachment 470 has a first portion 472 which aligns with an axis of the battery housing cavity 461, a second portion 474 projecting approximately perpendicular to the handle 463 of the D-shaped massage gun assembly 462 and the first portion 472, and a third portion 471 of a cushion which comprises an axis that is orthogonal to the massage gun handle 463. The second portion 474 serves to elevate the massage gun handle 463 above the cushion 471 of the focusing rest attachment 470, which is oriented orthogonal to the axis of the handle 463 of the D-shaped massage gun 460. The cylindrical portion 472 of the focusing rest attachment 470 contains the batteries which are used to power the machine gun assembly 462. Electrical contact 473 makes contact with an internal contact (not show) to transfer voltage to the circuit which powers the massage gun motor of the machine gun assembly 462.

Figure 22:
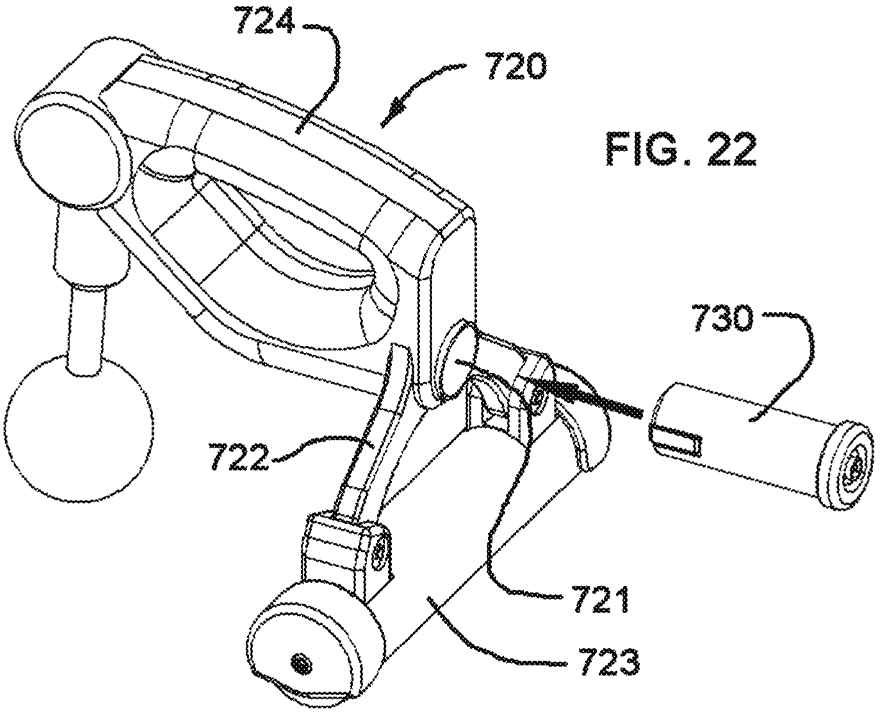
FIG. 22 is an illustration of an alternate embodiment of the self-conforming focusing rest where the structure is independent of the interchangeable battery and is instead permanently attached to the massage gun body of a D-shaped massage gun.

In another embodiment, the flexible cushion support is integrated into the flexible the housing of a massage gun. FIG. 22 is an illustration of an alternate embodiment of the self-conforming focusing rest where the structure is independent of the interchangeable battery and is instead permanently attached to the massage gun body of a D-shaped massage gun 720. The massage gun 720 has a first portion 724 which is grasped by the user and acts as a handle, a second portion 722 which extends approximately perpendicular from the handle portion, 724 and a third portion 723 whose axis lies orthogonal to the axis of the handle 724. The second portion 722 serves to elevate the handle 724 above a cushion of the third portion 723. In this figure, the interchangeable battery 730 is shown extracted from a battery cavity 721 of the housing of the D-shaped massage gun 720.

Other variations of the invention are apparent to those of skill in the art. While the preferred embodiment 220 utilizes pivoting spring anchors 225, 229 (FIG. 11), an alternate embodiment may eliminate the pivoting mechanism for the purpose of reducing manufacturing costs. In addition, other types of springs, such as tension springs, may be arranged to tension the flexible cylindrical cushion. Embodiments of the present invention can also be executed by changing the orientation of the flexible cushion such that the cushion axis is not orthogonal to the axis of the massage gun handle.

One of ordinary skill may also chose to utilize cross-sectional shapes other than circular shapes for the flexible cushion. Cross-sectional shapes that are non-uniform along an axis of the flexible cushion may also be utilized without detracting from the functional intent and spirit of the invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A removable battery assembly for supporting a handheld massage gun in contact with a fascia surface comprising:

a first portion having an axis, the first portion configured to be graspable by a user as a handle and defining a battery housing including a cavity having one or more batteries of the removable battery assembly;

a second portion adjoined integrally to the battery housing, at an angle;

a third portion having an axis orthogonal to the axis of the first portion and including an elastically deformable surface for contact of the fascia surface;

the third portion adjoined to a distal end of the second portion;

the second portion having an axis defined by its connection to the third portion, the axis of the second portion being non coaxial with the axis of the first portion and noncoaxial with the axis of the third portion;

wherein when the removable battery assembly is attached to the handheld massage gun, the second portion and the third portion are sized and shaped to stably support the handheld massage gun in a self-standing position on a surface, such that an axis of a piston of the handheld massage gun is configured to be maintained approximately perpendicular to the surface absent a grasp of the user; and wherein when the removable battery assembly is operationally attached to the handheld massage gun, whereby the third portion rests upon the fascia surface while grasped with one hand, movement of the third portion against the fascia surface is elastically responsive upon the fascia surface to a force applied to the battery housing when the force is directed orthogonal to the axis of the first portion.

2. The removable battery assembly of claim 1, wherein the first portion is attachable and detachable from a main body of the handheld massage gun.

3. The removable battery assembly of claim 1, wherein the battery housing is configured to allow the user to target a muscle or tissue with one hand by grasping the battery housing when the removable battery assembly is attached to the handheld massage gun and while the elastically deformable surface is in contact with the fascia surface.

4. The removable battery assembly of claim 1, wherein the third portion is pivotally suspended from the second portion.

5. The removable battery assembly of claim 1, wherein the elastically deformable surface of the third portion is adaptable to a curvature of different anatomical features of the user or a recipient.

6. The removable battery assembly of claim 1, wherein the angle is approximately ninety degrees.

7. The removable battery assembly of claim 1, wherein the angle is obtuse.

8. The removable battery assembly of claim 1, wherein the angle is acute.

9. The removable battery assembly of claim 1, wherein the third portion is pivotally suspended upon two rotatable anchors connected to the second portion, the two rotatable anchors rotating within a plane that is transverse to the axis of the first portion, and the axis of the third portion is deformable within the transverse plane defined by surfaces of the two rotatable anchors.

10. The removable battery assembly of claim 1, wherein the third portion is elastically deformable when attached to the second portion with non-rotatable anchors.

11. The removable battery assembly of claim 1, wherein the axis of the third portion is tensioned by one or more springs.

12. The removable battery assembly of claim 1, wherein the axis of the third portion is tensioned by a helical compression spring.

13. The removable battery assembly of claim 1, wherein the axis of the third portion is tensioned by a pair of torsion springs.

14. The removable battery assembly of claim 1, wherein the axis of the third portion is tensioned by resilience of an elastomeric member.

15. A removable attachment for supporting a handheld massage gun in contact with a fascia surface comprising:

a first portion having an axis parallel to an axis of a massage gun handle and defining a cavity for adjoining to the massage gun handle of the handheld massage gun;

a second portion integrally adjoined to the first portion at an angle;

a third portion having an axis orthogonal to the axis of the first portion and including an elastically deformable surface for contact of the fascia surface;

the third portion adjoined to a distal end of the second portion and having an axis orthogonal to the axis of the first portion;

the second portion having an axis defined by its connection to the third portion, the axis of the second portion being noncoaxial with the axis of the first portion and noncoaxial with the axis of the third portion;

wherein when the removable attachment is attached to the handheld massage gun, the second portion and the third portion are sized and shaped to stably support the handheld massage gun in a self-standing position on a surface, such that an axis of a piston of the handheld massage gun is maintained approximately perpendicular to the surface absent a grasp of a user; and wherein when the removable attachment is operationally attached to the handheld massage gun, whereby the third portion rests upon a muscle or a limb while grasped with one hand, movement of the third portion against the muscle or the limb is elastically responsive to a force applied to the massage gun handle of the massage gun when the force is directed orthogonal to an axis of the massage gun handle and towards the muscle or the limb.

16. The removable attachment of claim 15, wherein the second portion is connected to and supports the third portion, the elastically deformable surface pivotally suspended from the second portion.

17. The removable attachment of claim 15, wherein the elastically deformable surface of the third portion is adaptable to a curvature of different anatomical features of the user or a recipient.

18. The removable attachment of claim 15, wherein the third portion is pivotally suspended upon the second portion at a rotatable anchor, wherein the third portion is deformable within a plane of rotation controlled by the rotatable anchor.

19. The removable attachment of claim 15, wherein the third portion is suspended upon two spatially separated anchors on the second portion, and the two spatially separated anchors are non-rotatable.

20. The removable attachment of claim 15, wherein the axis of the third portion is tensioned by one or more springs.

21. The removable attachment of claim 15, wherein the axis of the third portion is tensioned by a helical compression spring.

22. The removable attachment of claim 15, wherein the axis of the third portion is tensioned by a pair of torsion springs.

23. The removable attachment of claim 15, wherein the axis of the third portion is tensioned by resilience of an elastomeric member.

24. A battery-powered massage gun comprising:

a main body defining a first cavity;

a reciprocating piston having a first end received within the first cavity of the main body and a second end for mounting a percussive massage head therefrom;

a first portion integrally adjoined to the main body and including a housing defining a handle with a handle axis, and a battery cavity for receiving at least one battery;

the battery-powered massage gun additionally comprising a second portion adjoined to the first portion, the second portion being integrally adjoined at an angle to the battery cavity for supporting the massage gun;

the battery-powered massage gun additionally comprising a third portion attached to a distal end of the second portion, the third portion having a third portion axis orthogonal to an axis of the battery cavity;

the second portion having an axis defined by its connection to the third portion, the axis of the second portion being noncoaxial with the axis of the battery cavity, and noncoaxial with the third portion axis;

wherein the second portion and the third portion are sized and shaped to stably support the battery-powered massage gun in a self-standing position on a surface, such that an axis of the reciprocating piston of the battery-powered massage gun is maintained approximately perpendicular to the surface, absent a grasp of a user.

25. The massage gun of claim 24, wherein the third portion is pivotally attached to the second portion.

26. The massage gun of claim 24, wherein the third portion is attached non-coaxially to the distal end of the second portion upon at least two spatially-separated anchors, the anchors being non-coincident with the third portion axis.

27. The massage gun of claim 24, wherein the third portion further comprises a flexible cushion support.

28. The massage gun of claim 24, wherein the third portion axis is controlled by rotatable anchors.

29. A method of adapting a piston-driven massage gun for operating upon a fascia surface utilizing a removable battery assembly having an elastically deformable contact surface suspended upon rotating anchors;

the method comprising the steps of attaching the removable battery assembly to the massage gun, grasping a battery housing of the removable battery assembly with one hand, positioning the elastically deformable contact surface upon a first anatomical region of the fascia surface to act as a fulcrum, rotating the massage gun about the fulcrum until a distal end of a reciprocating portion connected to a massage head contacts a second anatomical region of the fascia surface, applying mild pressure in a direction of the second anatomical region of the fascia surface, and deforming the rotatable anchors to deform the elastically deformable contact surface, such that vibratory contact is provided to the second anatomical region of the fascia surface while the elastically deformable contact surface conforms to curves of the first anatomical surface of the fascia region.

* * * * *